US007770159B2

(12) United States Patent
Pepin et al.

(10) Patent No.: US 7,770,159 B2
(45) Date of Patent: Aug. 3, 2010

(54) VIRTUAL TYPES

(75) Inventors: Brian K Pepin, Seattle, WA (US); Shawn P Burke, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 720 days.

(21) Appl. No.: 10/970,415

(22) Filed: Oct. 20, 2004

(65) Prior Publication Data

US 2006/0101431 A1    May 11, 2006

(51) Int. Cl.
G06F 9/45    (2006.01)

(52) U.S. Cl. ........................ 717/138; 717/140

(58) Field of Classification Search .......... 717/136–167
See application file for complete search history.

(56) References Cited

U.S. PATENT DOCUMENTS

| 5,583,988 | A * | 12/1996 | Crank et al. .................. 714/48 |
| 6,032,152 | A * | 2/2000 | Pearson .................. 707/103 R |
| 6,292,937 | B1 | 9/2001 | Sakta |
| 6,336,217 | B1 * | 1/2002 | D'Anjou et al. ............. 717/121 |
| 6,463,480 | B2 | 10/2002 | Kikuchi |
| 6,480,856 | B1 | 11/2002 | McDonald |
| 6,523,934 | B1 | 2/2003 | Beauchamp |
| 6,826,600 | B1 | 11/2004 | Russell |
| 6,922,200 | B1 * | 7/2005 | Marques ..................... 345/619 |
| 6,922,824 | B2 | 7/2005 | Swetland |
| 7,047,518 | B2 * | 5/2006 | Little et al. ................. 717/108 |
| 7,293,267 | B1 * | 11/2007 | Fresko ........................ 717/166 |
| 7,380,237 | B2 | 5/2008 | Goring |
| 2001/0056457 | A1 | 12/2001 | Kikuchi |
| 2002/0073396 | A1 * | 6/2002 | Crupi et al. ................. 717/104 |
| 2002/0198858 | A1 | 12/2002 | Stanley |
| 2003/0121024 | A1 | 6/2003 | Hill |
| 2003/0126310 | A1 * | 7/2003 | Ryzhov ...................... 709/328 |

(Continued)

OTHER PUBLICATIONS

Hansen, G.A., Simulating software development processes, IEEE, vol. 29 Issue: 1 Jan. 1996, pp. 73-77.*

(Continued)

*Primary Examiner*—Wei Y Zhen
*Assistant Examiner*—Satish Rampuria
(74) *Attorney, Agent, or Firm*—Workman Nydegger

(57) ABSTRACT

A "virtual type" that, to the reflection system, looks and acts like a fully compiled type—in reality, the "virtual type" does not exist and has been fabricated based on another API such as CodeDOM. Essentially, the "virtual type" allows code to be implemented using a single code path and therefore can remain ignorant that it is dealing with uncompiled source code. A "virtual type" is an object that looks just like a compiled type, provided that it is viewed through a reflection application program interface (API).

20 Claims, 10 Drawing Sheets

U.S. PATENT DOCUMENTS

| | | | |
|---|---|---|---|
| 2003/0163603 A1* | 8/2003 | Fry et al. | 709/328 |
| 2003/0237079 A1 | 12/2003 | Aggarwal | |
| 2004/0010776 A1* | 1/2004 | Shah | 717/117 |
| 2004/0015817 A1 | 1/2004 | Kress | |
| 2004/0015890 A1* | 1/2004 | Wong et al. | 717/137 |
| 2004/0025083 A1* | 2/2004 | Nanja et al. | 714/35 |
| 2004/0268309 A1* | 12/2004 | Grover et al. | 717/120 |
| 2005/0114848 A1* | 5/2005 | Choi et al. | 717/148 |
| 2005/0138623 A1* | 6/2005 | Fresko | 718/102 |
| 2005/0144606 A1* | 6/2005 | Li et al. | 717/162 |
| 2005/0278339 A1 | 12/2005 | Petev | |
| 2005/0289166 A1 | 12/2005 | Stanley | |
| 2006/0048103 A1 | 3/2006 | Archambault | |

OTHER PUBLICATIONS

Boldyreff, C.; Newman, J.; Taramaa, J., Managing process improvement in virtual software corporations, IEEE, Jun. 1996, pp. 142-147.*

Bennett, T.; Wennberg, P., Maintaining verification test consistency between executable specifications and embedded software in a virtual system integration laboratory environment, IEEE, Dec. 2003, pp. 221-228.*

Yonemoto, S.; Taniguchi, R, Human figure control software for real-virtual application, IEEE, Jul. 14-16, 2004, pp. 858-862.*

System Namespace, http://msdn.microsoft.com/library/default.asp?url-/library/en-us/cpref/html/frlrfsystem.asp, 8 pages, last view on Jul. 13, 2005.

ITypeInfo Interface, http://msdn.microsolft.com/library/default.asp?url-/library/en-us/automat/htm/chap9_24kl.asp, 1 page, last viewed on Jul. 13, 2005.

Matthew Fuchs, Object Oriented Programming Using XSD and XSLT, Dec. 7-12, 2003, XML Conference & Exposition 2003, pp. 1-12.

Hericko, et al., Object Serialization Analysis and Comparison in Java and .NET, Aug. 2003, ACM Sigplan Notices, vol. 38, Issue 8, pp. 44-54.

Gordon, et al., Validating a Web Service Security Abstraction by Typing, No. 2002, ACM, XMLSEC, pp. 18-29.

* cited by examiner

VIRTUAL TYPES

CROSS-REFERENCE TO RELATED APPLICATIONS

This application is related to pending U.S. patent application Ser. No. 10/967,724 entitled "Global Object System" filed on Oct. 18, 2004, the entirety of which is incorporated by reference herein.

TECHNICAL FIELD

This invention is related to computer systems and more particularly to a visual designer system and/or methodology to generate and employ a virtual type that when viewed through a reflection application program interface (API) appears, and can be employed, as a real type.

BACKGROUND OF THE INVENTION

Development environments are fundamentally centered on creating new object types. Often, it is desirable to expose these new types in a design time environment. Conventionally, exposing new types poses a problem because in order to use a new type, it must first be compiled. As well, situations exist when the user code cannot be compiled at a given time (e.g., it is in mid-development cycle). Even when the code can be successfully compiled, once a type is loaded into an application domain, the domain must be unloaded in order to load a new type.

Unloading a domain in the design environment is not supported in today's designer systems. Rather, types are loaded explicitly by a type resolution service and never unloaded. When new versions of types are introduced due to user changes, designers hosting instances of these types are saved to source code and reloaded. There are a number of unfortunate side-effects related to this conventional process. First, reloading a designer can be expensive. For example, live running objects must be converted to source code and re-parsed from that source code. Second, the "undo" state is lost during a reload. Additionally, because designers run in one domain, each reload leaks types defined in the user solution which, consequently, causes a slow memory leak.

As distributed object systems have become more popular, the ability to employ development tools with user interface (UI) elements has increased. For example, applications exist that include comprehensive tool sets for rapidly building and integrating web services, personal computer applications and web solutions. More particularly, development tools often include visual designers used to design user interface elements.

Traditionally, these visual designers focus only on the task at hand. However, when designing an application, a developer often needs to link the UI being designed to external objects such as data sources, images and other resources. Because the visual designer is designed to work with running instances of objects, there is no way for multiple designers to share resources from other locations within the development project. Therefore, there exists a need for a system that provides a mechanism for creating and utilizing global objects (e.g., virtual types that appear as real types) that can be used effectively by visual designers.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

A software development tool often needs to employ type information from source code that is not yet compiled into a built assembly. There are several application program interfaces (APIs) for dealing with this, including CodeModel and CodeDOM, but these APIs are distinct from reflection, which is a standard way of walking compiled assemblies.

The subject invention disclosed and claimed herein, in one aspect thereof, comprises a "virtual" type that, to the reflection system, looks like a fully compiled type. In reality, the "virtual type" does not exist and has been fabricated based on another API such as CodeDOM. Essentially, the "virtual type" allows code to be implemented using a single code path and therefore can remain ignorant that it is dealing with uncompiled source code.

A "virtual type" is an object that looks just like a compiled type, provided that it is viewed through a reflection API. All designers use the reflection API to examine types. Therefore, to a designer, there is no difference between a real type and a virtual type. In one aspect, a virtual type can include the following five components. First, a class that derives from Type that implements all of the reflection API in order to provide a concrete type object can be provided. Second, a virtual type can include a real, non-virtual class that defines the "base type" of the virtual type. When an instance is created from a virtual type, this base type is what is actually created. Third, a mechanism to define the shape of the virtual type—its properties, methods and events can be included. Fourth, the virtual type has a mechanism to provide an implementation for the various properties, methods and events defined on the virtual type. Finally, a way to populate a base type object that has been created to stand in for a virtual type is provided. Typically code needs to configure the base type instance in order to make it look like the virtual type.

In one aspect a system that facilitates virtually emulating a compiled type is provided. The system includes a builder component that receives a specification component and builds a clone of the compiled type in accordance with the specification. The system further includes an implementer component that provides an implementation of the clone that facilitates creation of instances of the clone in the form of a virtual type.

In another aspect the virtual type is a non-compiled type. It will be appreciated that the virtual type can inherit from the compiled type. The specification component can define a base type (e.g., bitmap). Additionally, the specification can be generated from a CodeDom tree or programmatically. Another aspect can include a reflection application program interface (API) that renders the virtual type in a manner consistent with the compiled type.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
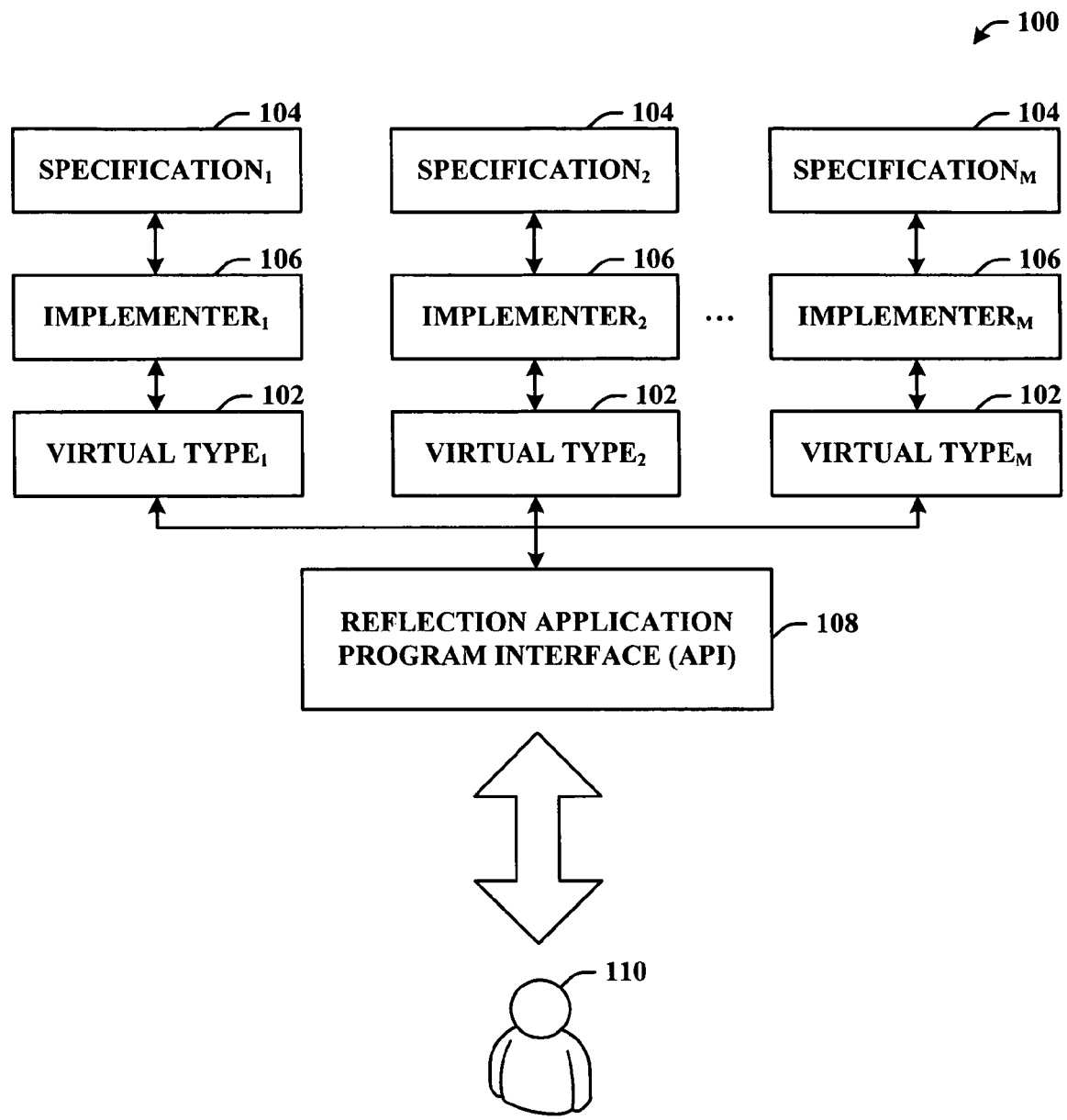
FIG. 1 illustrates a general block diagram of a system that employs a virtual type in accordance with an aspect of the invention.

The following terms are used throughout the description, the terminology and definitions are provided herein to assist in understanding various aspects of the subject invention.

Deserialization refers to the act of interpreting source code to create a live object. It is to be understood that this interpretation can be a simple, direct interpretation of the statements. Additionally, it can involve redirection to create a different type of object. For example, in one designer environment, the line "new ResourceManager(this)" in the form specification actually creates a different type of resource manager.

Designer Reload refers to the situation when the type of a live object in the designer changes. In this situation, the designer shuts down and reloads again by deserializing the source code. Types can change when a project is rebuilt. Designer reloads can be undesirable because they are usually slow and can destroy a user undo stack.

Global Object refers to an object whose instance is not per-form, but rather can be per-project.

Live Object refers to an object instance in the designer. In accordance with the subject invention, the designer uses instances retrieved from virtual types.

Serialization refers to the act of taking a live object and generating source code that represents how that object is currently configured. Executing the source code should create an object configured in the same manner as the live object.

Virtual Type refers to an object that stands in for a type when the real type is not available. Virtual types can act like normal types from a reflection standpoint.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention can be practiced without these specific details. In other instances, well-known structures and devices are shown in block diagram form in order to facilitate describing the subject invention.

Although many of the aspects and examples described herein are directed toward specific-brand designer environments, it is to be appreciated that the concepts and innovations described herein can be applied to and employed within any development (e.g., visual designer, visual web development) environment without departing from the scope and/or functionality of the claimed invention.

The subject invention is directed to an architecture for exposing a particular kind of global object, e.g., virtual types, to designers. As described supra, a global object can be referred to as an object that is published for an entire project, rather than for a single form. The core concepts and functionality of the global object system are described in the aforementioned Related Application. It will be understood that because global objects can be global to a project, they can therefore be single-instanced. Generally, global objects can be accessed via a static method or property on a class. Further, global objects can be custom types that are automatically generated by the project system.

In accordance with the invention, there is specific kind of global object that can be referred to as a "global type." As described herein, a global type can be a standard instanced object, but the type for this object is derived from a project in the solution or generated code. Although attempts have been made to expose these types through existing project references systems, these systems have several drawbacks because they are using real, compiled types. By way of example, global types can be as follows: DataSet cust=new CustomerDataSet( ).

Yet another kind of global object is the "virtual type." Essentially, virtual types can be described as a subset of the aforementioned Related Application, the Global Object System. In particular, the Global Object System is directed to a model and communication mechanism with respect to global objects overall. Virtual types refer to one kind of global object that is actually generated and/or communicated by the Global Object System.

It will be understood that once compiled code is loaded it cannot be easily unloaded. One novel feature of the virtual types is that it can eliminate the need to load real compiled code into a designer. One reason that this is particularly important is that, in accordance with conventional design features, all design tools are generated to work against running objects. However, running objects are not available unless the code is actually loaded.

There are a couple ways to address this situation. As described in accordance with the subject invention, the process of loading the real running objects can be avoided by defining a parallel world whereby the running objects are defined. Secondly, the conventional designs can be employed utilizing the real running objects.

There are several ways to get new objects from a project into the system so that a designer can use them. First, the objects can be compiled into a dynamic link library (DLL) and loaded. On the other hand, reflection emit can be employed which actually builds the intermediate language into common runtime language (CLR) that defines a class. Once defined, the CLR can ask the reflection emit to produce assembly that can then be loaded. Both of these solutions inject additional, and undesirable, DLL files that cannot be unloaded.

Thus, the virtual types of the subject invention provide a system and/or methodology to simulate these processes without actually loading the real code. With reference to FIG. 1, such a system (e.g., architecture 100) is shown. A virtual type 102 can have two associated components: a specification 104 and an implementer 106. The specification 104 can be specific to a type. The implementer 106 provides the details. In other words, the implementer 106 can provide an actual implementation of the virtual type 102. It will be appreciated that many designer applications, especially those related to automatically generated types, can employ a stock implementer. In other words, the stock or default implementer can be employed in connection with every type.

Alternatively, in other aspects, a specialized implementer 106 can be employed. For example, an implementer can be employed in connection with strongly typed resource files. In another exemplary aspect, an implementer can be employed in connection with any kind of data table. It is to be appreciated that specialized implementers 106 can be employed in any desired scenario without departing from the scope and functionality of the present invention.

Further, it will be understood, that in the scenario where a stock or default implementer is employed, the specification 104 alone can define the virtual type 102. Turning now to mechanisms in which a specification 104 can be supplied—First, the reflection emit methodology can be employed. For example, the specification 104 can be built one property, one method, one class at a time. On the other hand, in accordance with an aspect of the subject invention, a virtual type builder (not shown) can be employed. As illustrated in FIG. 1 and as discussed supra, the virtual type 102 will appear to a designer 110 as a real type when accessed via a reflection API (application program interface) 108.

Figure 2:
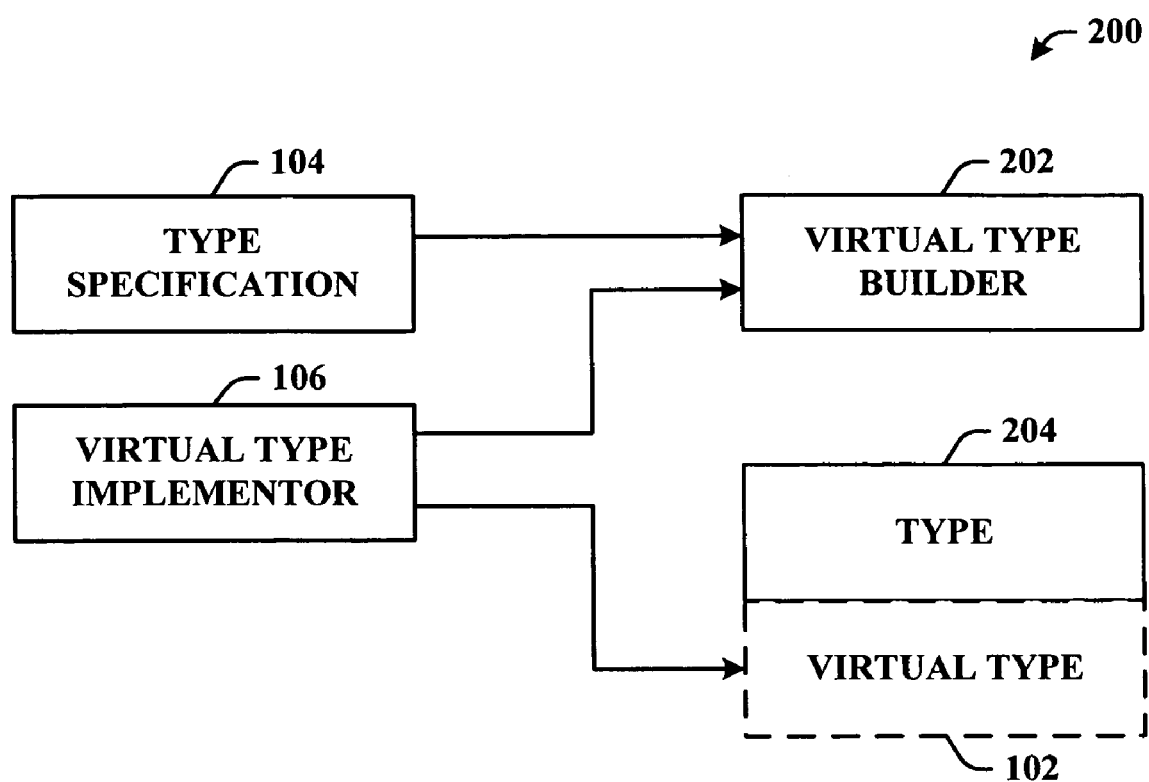
FIG. 2 illustrates an exemplary block diagram of a system for generating a virtual type in accordance with a disclosed aspect of the present invention.

As illustrated in FIG. 2, a virtual type system 200 generally includes a specification 104, an implementer 106 and a builder 202. The builder 202 can include a subcomponent called virtual type 102. Essentially, this subcomponent is an internal implementation detail that is exposed as type 204. In other words, virtual type 102 derives from type 204.

In operation, an existing type specification 104 can be fed into a virtual type builder 202 whereby a clone of the existing type 204 can be built. Alternatively, a CodeDom tree can be supplied to the virtual type builder 202. It will be appreciated that a CodeDom tree refers to an object language that represents source code. The virtual type builder 202 can effect building the type automatically from the CodeDom tree.

By doing this, when viewed via the reflection API (e.g., 108 of FIG. 1), the resulting type looks like a standard CLR type and acts like a standard CLR type. However, it is essentially a garbage collectable object that does not have any real assembly associated to it. It is a virtual type. Accordingly, it will be understood that if the type is not being used, it can garbage collect and therefore does not consume memory. Additionally, changes can be made to this type to create a new type. Upon using the new type, the old type can be discarded.

Essentially, virtual types effect mimicking the act of compiling a type and subsequently moving the new type in. Another reason for employing virtual types is that they can emulate public objects. For example, in a designer, everything that is defined as "internal" cannot usually be accessed. It will be understood that this access is denied since the user would only have access to public types being referenced.

However, situations exist when a designer should allow a user access to types marked as "internal." Types within the user's project may be internal but should still be accessible to the designer. Automated code generators do not know where a type comes from, however, so they cannot tell the difference between an external type that is marked internal and one from the user's own code. As a result, these items are typically discarded. Unfortunately, when writing a program, a designer does not always want to keep all of the components "public." Rather, most often it is desirable to keep them "internal." However, because of the aforementioned uncertainty, automated code generators were unable to determine what was actually "internal" (e.g., accessible) and what was "internal" but, from an external source (e.g., not accessible). Thus, the virtual types of the subject application can address these situations by exposing internal and accessible types as public to a code generator.

In accordance with the subject invention, a specification for an original internal type can be replicated as described supra. Next, the implementer 106 can call back to the original instance of the object. However, a virtual type permits a designer to modify the metadata whereby the type is actually defined as "public." In this situation, the code generator thinks it is dealing with a public type. Instead, because the metadata has been modified, the code generator is actually talking with a virtual type that is referencing an internal type.

Turning now to a detailed discussion of a Virtual Type API. As noted supra, virtual types as described herein can help solve these aforementioned issues. A virtual type is an object that looks just like a compiled type, provided that it is viewed through a reflection API (e.g., 108 of FIG. 1). It will be appreciated that designers regularly use the reflection API to examine types. Therefore, to a designer, there is no difference between a real type and a virtual type.

Figure 3:
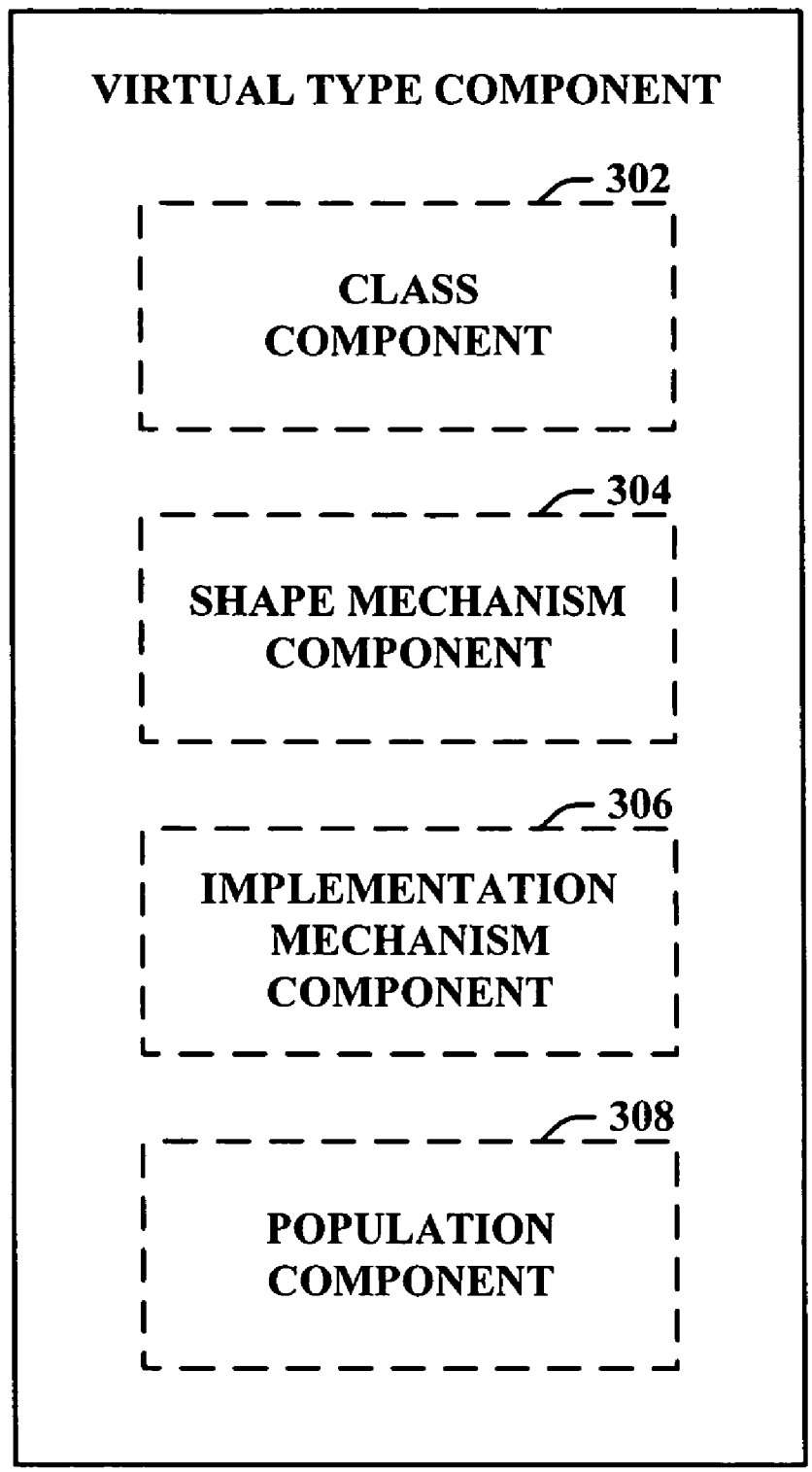
FIG. 3 illustrates a component block diagram of a virtual type in accordance with an exemplary aspect.

Now with reference to FIG. 3, in accordance with the subject invention, a virtual type 300 can include the following components. A class component 302 that derives from the type that implements all of the reflection API in order to provide a concrete type object—a real, non-virtual class component that can define the "base type" of the virtual type. In operation, when an instance is created from the virtual type 300, this base type is what is actually created. A shape mechanism component 304 that defines the shape of the virtual type can be provided—its properties, methods and events is included within the virtual type 300. Additionally, an implementation mechanism component 306 to provide an implementation for the various properties, methods and events defined on the virtual type 300 is included. And finally, a method (e.g., population component 308) is included to populate a base type object that has been created to stand in for a virtual type 300. Typically, code can be employed to configure the base type instance in order to make it look like the virtual type.

Essentially, these components (302, 304, 306, 308) can be defined as a series of three classes: VirtualType, VirtualTypeBuilder and VirtualTypeImplementor. Each of these components (e.g., classes) will be described in greater detail infra. Referring again to FIG. 2, a system 200 in accordance with an aspect of the subject invention is shown. Generally, system 200 can include a type specification 104, a virtual type 102, a virtual type builder 202 and a virtual type implementer 106.

The virtual type can be expressed as an internal class (e.g., VirtualType) that defines the virtual type itself. VirtualType derives from System.Type. The VirtualTypeBuilder is a public class that can be used as a factory to build new virtual types. A virtual type builder can have a variety of methods and properties for configuring a resulting virtual type. When configuration of the type shape through a virtual type builder is complete, a Create method can be called to create a new VirtualType to those specifications. The VirtualTypeImplementator is an abstract class one derives from to provide an implementation of the virtual type. This class can be accessed to provide implementations of members and create instances of a virtual type base class.

Turning now to a discussion of the virtual type (e.g., VirtualType)—VirtualType is internal and derives from System.Type. In one aspect, it can implement all abstract methods of Type. To Reflection and TypeDescriptor, VirtualType is indistinguishable from a runtime type. In other words, it appears as a real type.

The VirtualTypeBuilder is used to create a new virtual type. A builder pattern can be employed to effect the configuration needed to create a virtual type (e.g., properties, methods and events can be defined). VirtualTypeBuilder can build a type in a number of manners. By way of example, the Builder can accept direct adds and removes from its various member collections or it can be initialized from a CodeDom CodeTypeDeclaration.

An exemplary API for a Virtual Type Builder is shown below:

```
public sealed class VirtualTypeBuilder {
    public AssemblyName AssemblyName { get; set; }
    public Type BaseType { get; set; }
    public VirtualTypeImplementor Implementor { get; set; }
    public bool IsPublic { get; set; }
    public bool IsSerializable { get; set; }
    public string TypeName { get; set; }
    public AttributeCollection Attributes { get; }
    public EventInfoCollection Events { get; }
    public FieldInfoCollection Fields { get; }
    public MethodInfoCollection Methods { get; }
    public PropertyInfoCollection Properties { get; }
    public Type CreateType( );
    public void InitializeFromType(ITypeResolutionService typeResolutionService,
                CodeTypeDeclaration typeDecl);
    public void InitializeFromType(ITypeResolutionService typeResolutionService,
                CodeTypeDeclaration typeDecl, string nsName);
    public void InitializeFromType(ITypeResolutionService typeResolutionService,
```

-continued

```
                CodeNamespace ns);
    public sealed class AttributeCollection : CollectionBase {
        internal AttributeCollection( );
        public int Add(Attribute attribute);
        public Attribute this[int index] { get; set; }
        public void Clear( );
        public void Remove(Attribute attribute);
    }
    public sealed class ConstructorInfoCollection : CollectionBase {
        internal ConstructorInfoCollection ( );
        public int Add(Type[] argumentTypes);
        public int Add(Type[] argumentTypes, Attribute[] attributes);
        public ConstructorInfo this[int index] { get; set; }
        public void Clear( );
        public void Remove(ConstructorInfo constructor);
    }
    public sealed class EventInfoCollection : CollectionBase {
        internal EventInfoCollection( );
        public int Add(string name, Type handlerType);
        public int Add(string name, Type handlerType, Attribute[] attributes);
        public int Add(string name,
            Type handlerType,
            Attribute[] attributes,
            MethodAttributes methodAttributes);
        public EventInfo this[int index] { get; set; }
        public void Clear( );
        public void Remove(EventInfo eventInfo);
    }
    public sealed class FieldInfoCollection : CollectionBase {
        internal FieldInfoCollection( );
        public int Add(string name, Type fieldType);
        public int Add(string name, Type fieldType, Attribute[] attributes);
        public int Add(string name,
            Type fieldType,
            Attribute[] attributes,
            FieldAttributes fieldAttributes);
        public FieldInfo this[int index] { get; }
        public void Clear( );
        public void Remove(FieldInfo fieldInfo);
    }
    public sealed class MethodInfoCollection : CollectionBase {
        internal MethodInfoCollection( );
        public int Add(string name, Type returnType, Type[] paramTypes);
        public int Add(string name,
            Type returnType,
            Type[] paramTypes,
            Attribute[] attributes);
        public int Add(string name,
            Type returnType,
            Type[] paramTypes,
            Attribute[] attributes,
            MethodAttributes methodAttributes);
        public MethodInfo this[int index] { get; }
        public void Clear( );
        public void Remove(MethodInfo methodInfo);
    }
    public sealed class PropertyInfoCollection : CollectionBase {
        internal PropertyInfoCollection( );
        public int Add(string name, Type propertyType, bool readOnly);
        public int Add(string name, Type propertyType, bool readOnly,
            Type[] paramTypes);
        public int Add(string name, Type propertyType, bool readOnly,
            Attribute[] attributes);
        public int Add(string name,
            Type propertyType,
            Attribute[] attributes,
            PropertyAttributes propertyAttributes);
        public int Add(string name,
            Type propertyType,
            Type[] paramTypes,
            Attribute[] attributes);
```

-continued

```
public int Add(string name,
    Type propertyType,
    Type[] paramTypes,
    Attribute[] attributes,
    MethodAttributes methodAttributes);
public PropertyInfo this[int index] { get; }
public void Clear( );
public void Remove(PropertyInfo propertyInfo);
```

In accordance with the exemplary VirtualTypeBuilder class, the AssemblyName property sets the name of the assembly for which this virtual type should belong. The default value is an empty assembly name object. The BaseType property is the base type this virtual type derives from. A base type can be a real runtime type, not another virtual type. The default value of this property can be type Object. The Implementer Property sets the implementer that will be used for the virtual type. A virtual type implementer can provide the instance information for the type. For example, the virtual type implementer can determine what to do when a property is set. The default value of this property can be null.

The IsPublic property can determine if a virtual type is public or not. It will be appreciated that the default can be either case. The Is Serializable property can determine if the virtual type is serializable. The value assigned to this property can match the behavior of instances returned from the InvokeConstructor method of the type implementer. If this property indicates that an object is serializable, but the type implementer returns an object that is not serializable, an exception will be thrown.

The TypeName property can set the name for the virtual type. This should be the fully-qualified name that is reported as the type name through reflection. The simple type name will be fabricated by parsing the full type name. The default value of this property can be null. The Events property can provide access to a collection of events. The collection can be modified at any time. Similarly, the Fields property can provide access to a collection of fields. The collection can be modified at any time.

The Methods property can provide access to a collection of methods. The collection can be modified at any time. Likewise, the Properties property provides access to a collection of properties. The collection can be modified at any time. CreateType method creates a virtual type based on the configuration of this virtual type builder. However, if the virtual type builder is not completely configured, InvalidOperationException is used. A virtual type builder must have a type name, a base type and an implementer to be considered completely configured. The InitializeFromType method initializes this virtual type builder with data obtained from the given type. This will clear all member collections and re-populate them based on a type declaration.

The AttributeCollection derives from a standard CollectionBase. It is illegal to add anything to this collection except Attribute objects. AttributeCollection is nested inside of VirtualTypeBuilder due to its specific behavior related to virtual types. In accordance thereto, the AttributeCollection constructor constructs a new instance for this class. The Add method adds the given attribute to the collection. Attributes are added in the order expected to be declared on the class. Thus, to add attributes that would be declared on a physical class (e.g., [Browsable(true)], [Description("Hello world")], public class MyClass { }), the following attributes would be added—Add(new DescriptionAttribute("Hello world")) Add (BrowsableAttribute.Yes).

It will be appreciated that attributes that are marked as "allow multiple" will be added multiple times, while those not marked with allow multiple will only be added once, with the last one added taking precedence (the same treatment as a compiler). The Item property returns the attribute at the given index. Additionally, the Clear method clears the collection and the Remove method Removes the requested attribute. If the attribute is not currently in the collection nothing is effected.

Turning now to the ConstructorInfoCollection class, the ConstructorInfoCollection derives from a standard CollectionBase. It is illegal to add anything to this collection except ConstructorInfo objects. Add using the overridden add methods create individual ConstructorInfo objects. ConstructorInfoCollection is nested inside of VirtualTypeBuilder due to its specific behavior related to virtual types. In accordance thereto, the ConstructionInfoCollection constructor constructs a new instance of the class.

The Add method adds a new ConstructorInfo to the collection of constructors this type builder will produce on the final type. The Item property returns the constructor info at the given index. Clear method appropriately clears the collection whereas the Remove method removes the requested constructor info. It will be appreciated that this Remove method does nothing if the constructor info is not currently in the collection.

The EventInfoCollection derives from a standard CollectionBase. It is illegal to add anything to this collection except EventInfo objects. Using the overridden add methods create individual EventInfo objects. EventInfoCollection is nested inside of VirtualTypeBuilder due to its specific behavior related to virtual types. The EventInfoCollection constructor constructs a new instance of this class. The Add method adds a new EventInfo to the collection of events this type builder will produce on the final type. If handlerType is not a runtime type, typeAttributes does not contain public or contains set bits other than Public and Static, or attributes passed in through the attributes parameter cannot be applied to events. As well, if name, handlerType or an element in attributes is null, attributes itself can be null.

The Item property can return the event info at the given index. The Clear method clears the collection whereas the Remove method removes the requested event info. Additionally, the Remove method does nothing if the event info is not currently in the collection.

Now with reference to the FieldInfoCollection class of the aspect, the FieldInfoCollection class derives from a standard CollectionBase. It is illegal to add anything to this collection except FieldInfo objects. Using the overridden add methods create individual FieldInfo objects. FieldInfoCollection is nested inside of VirtualTypeBuilder due to its specific behavior related to virtual types. A new instance of the class is constructed by the FieldInfoCollection constructor. The Add method adds a new FieldInfo to the collection of fields this type builder will produce on the final type.

The Item property returns the field info at the given index and the Clear method clears the collection. The Remove method removes the requested field info. If the field info is not currently in the collection, the Remove method does nothing.

The MethodInfoCollection class derives from a standard CollectionBase. It is illegal to add anything to this collection except MethodInfo objects. Using the overridden add methods create individual MethodInfo objects. MethodInfoCollection is nested inside of VirtualTypeBuilder due to its specific behavior related to virtual types. The MethodInfoCollection constructor constructs a new instance of the class.

The Add method adds a new MethodInfo to the collection of methods this type builder will produce on the final type. The Item property returns the method info at the given index. Clear method clears the collection and Remove method removes the requested method info. If the method info is not currently in the collection the Remove method does nothing.

The PropertyInfoCollection class derives from a standard CollectionBase. It is illegal to add anything to this collection except PropertyInfo objects. Using the overridden add methods create individual PropertyInfo objects. PropertyInfoCollection is nested inside of VirtualTypeBuilder due to its specific behavior related to virtual types. A new instance of the class is constructed via the PropertyInfoCollection constructor.

The Add method adds a new PropertyInfo to the collection of properties this type builder will produce on the final type and the Item property returns the property info at the given index. The Clear method clears the collection and the Remove method removes the requested property info. If the property info is not currently in the collection, the Remove method does nothing.

Turning now to the VirtualTypeImplementor, it is to be understood that a virtual type has no implementation. Therefore, the implementation must come from elsewhere (e.g., VirtualTypeImplementor). The VirtualTypeImplementor acts as the implementation part of a virtual type. Following is an exemplary implementer in accordance with an aspect:

```
Public abstract class VirtualTypeImplementor {
    public abstract void AddEventHandler(EventInfo eventInfo,
        object instance,
        Delegate handler);
    public abstract object GetField(FieldInfo field, object instance);
    public abstract object GetPropertyValue(PropertyInfo property,
        object instance,
        object[] args);
    public abstract object InvokeConstructor(ConstructorInfo ctor, object[] args);
    public abstract object InvokeMethod(MethodInfo method,
        object instance,
        object[] args);
    public abstract void RemoveEventHandler(EventInfo eventInfo,
        object instance,
        Delegate delegate);
    public abstract void SetField(FieldInfo field, object instance , object value);
    public abstract void SetPropertyValue(PropertyInfo property,
        object instance,
        object value,
        object[] args);
```

In accordance with the exemplary VirtualTypeImplementorClass, the AddEventHandler method can add the given delegate to a given event. The GetField method can return the value of the requested field. The GetPropertyValue method can return the value of the requested property.

The InvokeConstructor method can be used by a type implementer to create an instance of a type. If the virtual type was marked as serializable, this object must be serializable as well. The InvokeMethod method can invoke the given method. If the method had a return value, this method can return it. Otherwise, the method can return null. The RemoveEventHandler method can remove the given delegate from the given event. A given field is set to a given value by the SetField method. Likewise, a given property is set to a given value by the SetPropertyValue method.

In an alternative aspect, the virtual types described supra can have some limitations. For example, due to security constraints it may not be possible to override System.Object.GetType( ). In other words, calling GetType on instances created from virtual types can return the virtual type BaseType property, not the virtual type. TypeDescriptor can insulate one from this characteristic through its GetClassName method (which can return the virtual type name) and its reflection methods (which, even though the object instance is not of the virtual type, the virtual type metadata is available through TypeDescriptor due to a custom type description provider the virtual type fabricated).

The subject invention addresses core components that can contribute to implementations of virtual types. First, the Global Object API component refers to the API presented to clients who wish to publish or use global objects. Second, the Virtual Type API component discussed supra refers to the API exposed to a client that allows the shape of a type to be shared without actually creating that type via compilation or reflection emit.

With reference again to FIG. 1, an architecture of a system 100 capable of exposing virtually generated types in a designer is shown. Generally, system 100 includes a virtual type component 102 that can be exposed to a user 110 via a reflection API 108. As illustrated, system 100 can include 1 to M virtual types, where M is an integer. Virtual types 1 to M can be referred to individually or collectively as virtual types 102. As described supra, a "virtual type" refers to an object that can stand in for a type when the real type is not available. It will be appreciated that a "virtual type" is a specialized kind of global type. "Virtual types" can act like normal types from a reflection standpoint. In other words, when a user 110 views virtual type 102 via reflection API 108, the virtual type 102 appears and acts as a normal (e.g., compiled) type to the user 110 (e.g., designer).

Figure 4:
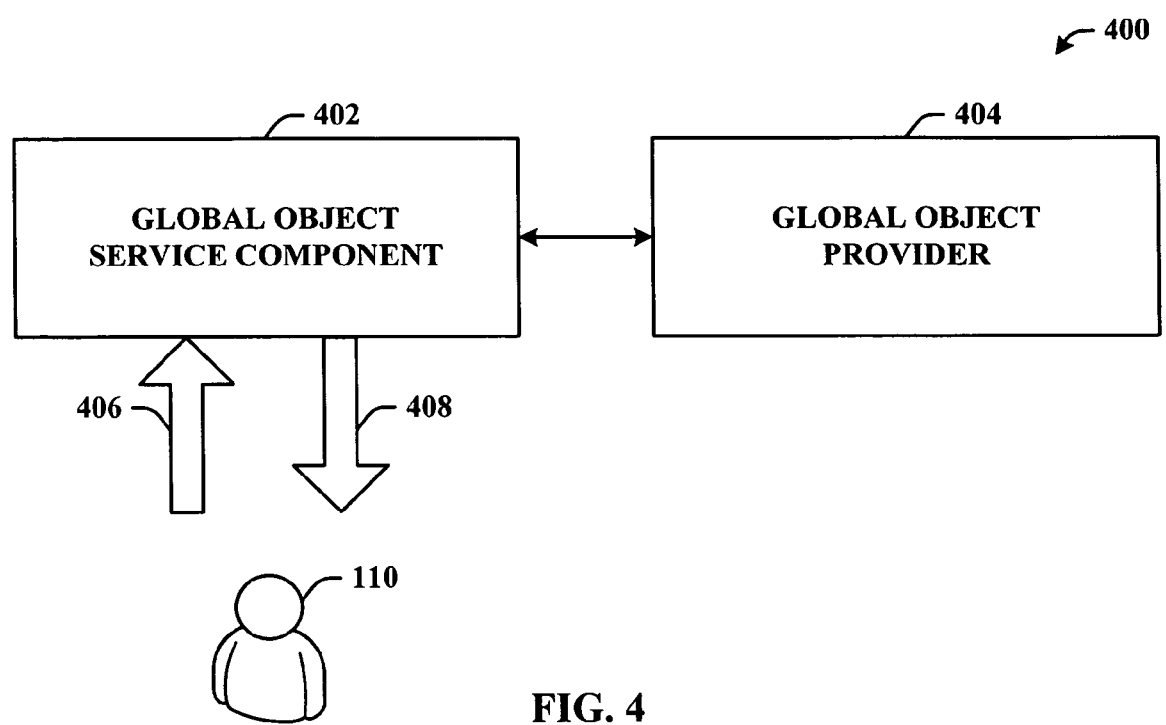
FIG. 4 illustrates a general component block diagram of a system for sharing global objects in accordance with an aspect of the invention.

Referring now to FIG. 4, a schematic block diagram of a system that facilitates generating, updating and delivering global objects (e.g., virtual types) in accordance with an aspect of the subject invention is shown. Generally, the system 400 of FIG. 4 can include a global object service component 402 and a global object provider component 404. In operation, a user 110 (or application) can request a global object from the global object service component 402. For instance, the request can be for references (e.g., virtual types) that derive from a specific type (e.g., bitmap). In turn, the global object service component 402 can communicate with the global object provider component 404 in order to obtain requested global objects in accordance with the request 406. The global object provider 404 can be invoked and therefore, transfers the requested global objects 408 to the global object service 402 as illustrated. The global object service 402 thus can make the global objects 408 available to the user 110.

In accordance with an aspect of the subject invention, a simple API component or interface component can be employed for registering global objects that can be used by a data team and client team as described herein. Additionally, the system 400 is provided and can be employed to effect a change of one or more global objects frequently without requiring a reload of the designer. Moreover, in accordance with aspects of the subject invention, global objects can be serialized and deserialized in code generation. These aspects will be described in greater detail infra.

The global object API described is directed toward a system and/or methodology that can be employed to register and discover global objects for a project. It will be appreciated that virtual types can create types based on an arbitrary base class (e.g., ResourceManager or DataSet) and have those instances configured with data from the project. Virtual types can allow global data sources and resources to change without causing the designer to reload. Finally, the Resource Picker Integration describes a system and/or methodology of updating the resource picker to support global objects.

The following exemplary scenarios are included to provide context to the invention. It is understood that the exemplary scenarios are not provided to limit the scope and/or functionality of the invention in any way. Those skilled in the art will appreciate that the novel concepts and functionality described herein can be employed in connection with scenarios other than those described below without departing from the scope of the described and claimed invention.

In a first scenario, suppose the user 110 requests and receives a global object that derives from bitmap through the global object service component 402. In accordance with this aspect, this bitmap "lives" in an application specific to the user 110 and can be shared between all designers in the project. When the user 110 saves the form, the following line of code is emitted into the form code: Me.BackgroundImage=TealButtonsRuleResources. TealBitmap—Subsequently, when user 110 closes and re-opens the project, the background image of the form is still set to the bitmap (e.g., TealBitmap).

Behind the scenes a global object is generated. More particularly, a global object is automatically fabricated in this scenario. The designer team can create a GlobalObjectProvider capable of fabricating global objects from RESX files. It will be appreciated that the strongly typed resources generated from a RESX file can be in the form of a non-creatable class with all static properties. The global object provider 404 can fabricate the following two global objects for each project-level RESX file. First, a global object for the static class wrapping the resource file can be provided. Second, a global object for the return value of each static property of the resource class can be provided.

It should be understood that because there is no instance of the all-static global object, the latter set of global objects is provided. The all-static class can be offered as a global object and can offer static properties via a virtual type. The return values from these properties should have been obtained via the instance property of each of the various global objects. This complexity is particularly important because static types like this are not actually compiled, but all global objects are explicitly tracked so that their serialization and deserialization can be successful.

In a second exemplary scenario, a Customers table can be exposed in a DataSource drop down. In this scenario, user 110 sets up a global Customers table using a data design environment. User 110 drags a DataGridView onto his form and drops open the DataSource property. "Customers" is listed as a data source. User 110 chooses it, and the following code is generated
Me.DataGridView1.DataSource=Customers.Instance.

Behind the scenes a global object provider 404 has been registered that is capable of creating a global object for an XSD file. The global object is a virtual type that offers a single static property—an instance. Each form designer can maintain a modified IReferenceService that offers global objects as references, which can allow user 110 to pick the global object from a drop-down. This reference list can be made available via the global object service 402. The reference service (e.g., global object service 402) is intelligent and can exclude those objects in a global object table that are already in the design container of the global object service 402. When a global object is chosen from the global object table, it can be sited, if needed, and returned from the reference service. The GlobalObject itself registered a custom serializer for the instance of the data set returned from Customers.Instance. Therefore, this exemplary data set can be correctly serialized as "Customers.Instance".

A third scenario is directed to changing a Customers table schema that has already been bound. Suppose user 110 sets DataGridView to point to the Customers table, but has updated the schema for the table. As expected, user 110 sees that the DataGridView contains the updated schema automatically.

Figure 5:
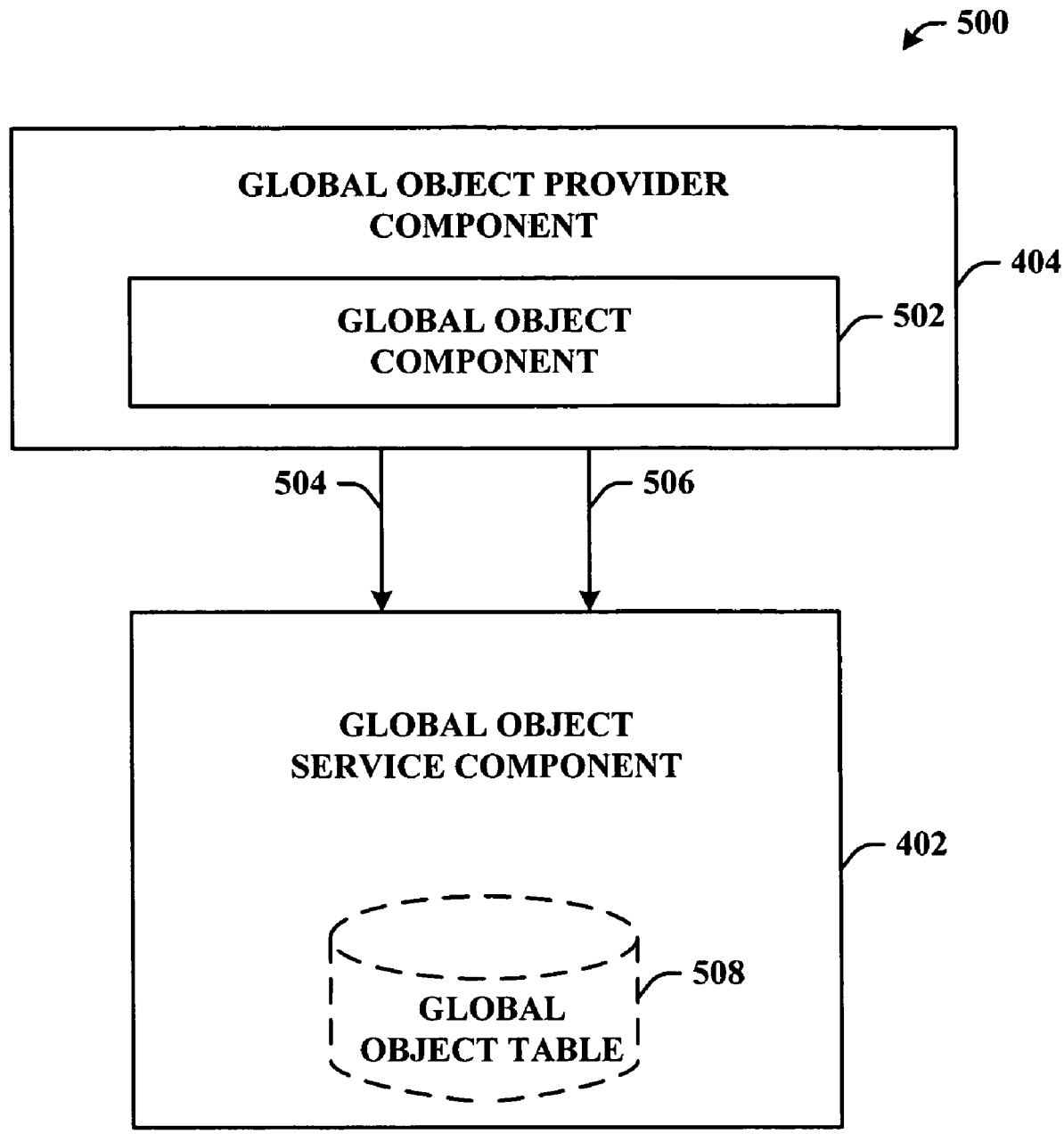
FIG. 5 illustrates an exemplary block diagram of a system for updating global objects in accordance with a disclosed aspect.

Turning now to FIG. 5, behind the scenes, when a change is made to the XSD schema, the data designer global object 502 can raise a pair of Changing and Changed events 504, 506. These events 504, 506 will cause the global object service 402 running on the designer to announce to any references of the data source to update to the new value.

More particularly, the global object 502 announces a change via the changing notification 504. In one aspect the global object service 402 can record the instance values and a location where the instance is applied to properties in the global object table 508. The global object 502 announces that the change is complete via changed notification 506. Finally the global object service 402 announces the changes and effects the changes to the new instance of the global object 502. It will be appreciated that cross-domain applications can exist and will be discussed infra.

A fourth scenario is directed to a situation whereby a customer routes property values to a configuration file. Suppose user 110 sets up a connection between the application configuration file and the text property on the form through the typed settings designer. The result of this connection is that the code generated of the form changes to the following: this.Text=ApplicationSettings.Form_Text Behind the scenes a designer registered a global object provider 404 capable of creating a global object 502 for the application configuration file. In one aspect, the global object 502 can be a virtual type that offers a series of static properties, the value of each being a global object itself. A custom property can be added to the form to choose designer settings. When this property is configured, the return value from one of the static properties of the global object 502 will be assigned to the correct property on the form.

The aforementioned scenarios are provided to add context to aspects of the invention and will become more apparent upon a review of the detailed descriptions and other exemplary aspects that follow.

Turning now to a discussion of a Global Object API. The Global Object API component can be employed to facilitate publication, modification and/or use of global objects (e.g., virtual types). By way of example, the Global Object API component refers to the API exposed to a development environment client in order to publish and/or use global objects.

As described in greater detail infra, in accordance with exemplary aspects, five basic components can be included in the system (e.g., Global Object API)—1) Global Object Service Component, 2) Global Object Provider Component, 3) Global Object Factory Component, 4) Global Object Component, 5) Global Object Provider Attribute. Each of these components will be discussed in detail with reference to FIG. 3 below.

Figure 6:
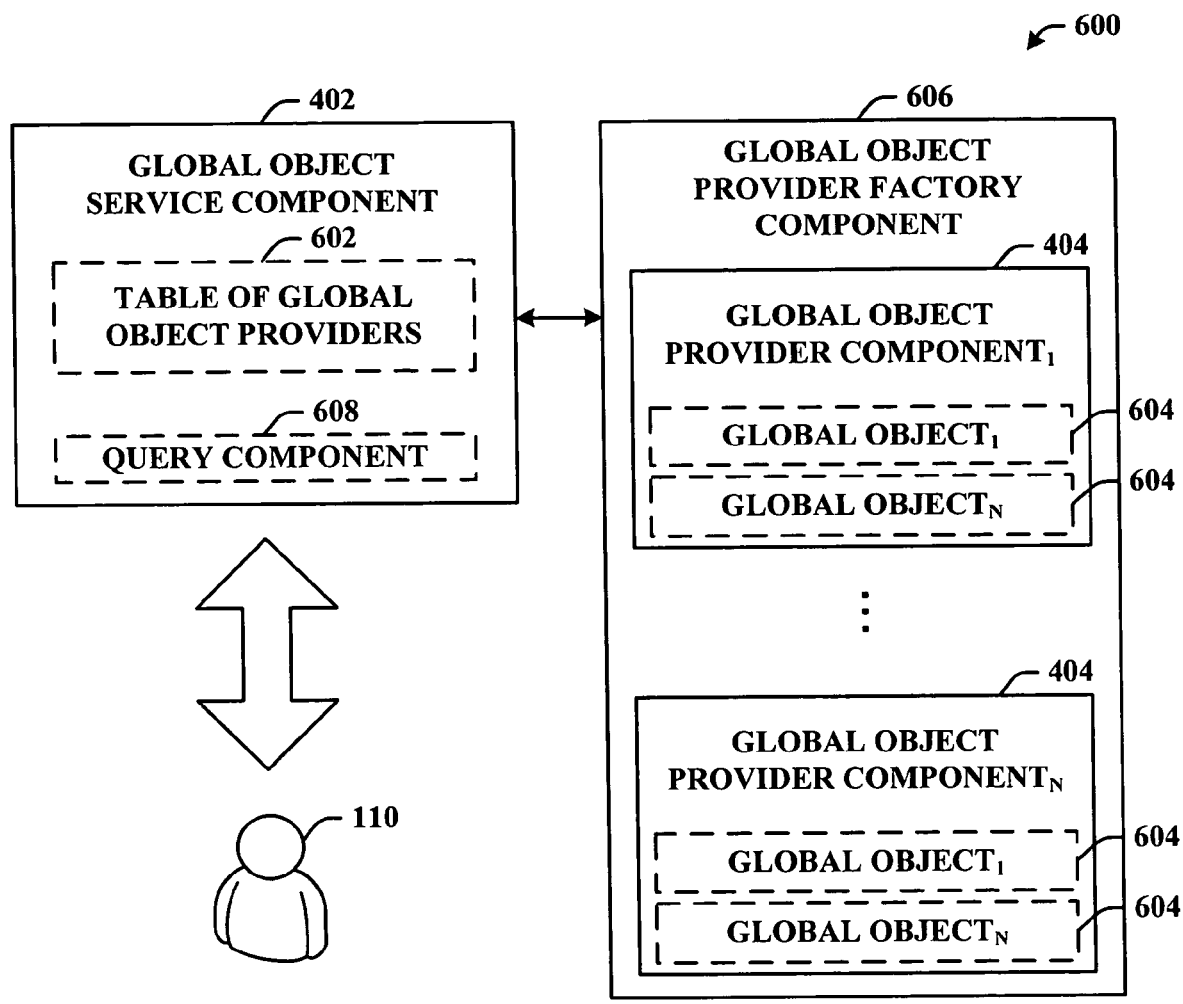
FIG. 6 illustrates an exemplary schematic block diagram that illustrates a provider factory and multiple providers for generating a variety of global objects in accordance with a disclosed aspect.

With reference now to FIG. 6, system 600 is shown. Global object service component 402 is the service responsible for maintaining a table 602 of global object providers 404. The designer loader can add this service 402 to the service container during load. In one aspect, the service 402, specifically the table 602, can be queried by the IReferenceService and ITypeResolutionService objects as needed.

With continued reference to FIG. 6, a global object provider component 404 is an object that can provide global objects 604 to designers. As illustrated, a global object provider factory 606 can be included. The global object provider factory 606 can have 1 to N global object providers, where N is an integer. It will be appreciated that global object provider components 1 to N can be referred to individually or collectively as global object provider(s) 404. It will be understood that disparate global object providers 404 can be resident with respect to the global object factory 606 whereby, the disparate global object providers 404 can generate distinct global objects (e.g., RESX, XSD).

In operation, the global object providers 404 can be queried by the global object service 402 on-demand. In other words, when a user 406 asks for a list of a particular type of global object 604 or for global objects 604 that derive from a particular type, the query component 608 can be employed to facilitate querying the global object provider factory 606 to identify appropriate global object provider(s) 104 capable of generating matching global objects 604.

The global object provider factory component 606 can facilitate delivery of a collection of global object provider components 404. This factory component 606 can be accessed by the global object service component 402 to build a list of providers 404 that can be employed to generate appropriate global objects 604. An attribute component can be employed by the global object provider factory component 606 to declare (e.g., identify) global object provider components 104. Further, this factory component 606 can be global (e.g., there can a default implementation provided by the design package), but it can be replaced by the project context service provider if desired. This allows the project to control which global object provider components 404 are available. It is to be understood that the factory 306 can be located remotely if desired.

The global object component 604 illustrated in FIG. 6 is the global object itself. As illustrated, consistent with the global object providers 404, 1 to N global objects can exist—where N is an integer. A global object 604 is essentially a container that contains data about a global object. For example, a global object 604 can include, but is not limited to, its type, the ability to create an instance of the object and an event that can be raised when the object changes.

As noted supra, it is to be understood that global objects 604 can be applicable across application domains if desired. For at least this reason, it is contemplated and will be understood that the innovations and concepts discussed herein can be employed to implement designers in any domain. As well, the subject invention can be employed in multiple and/or cross-domain applications. In accordance thereto, alternative API aspects can be employed as appropriate without departing from the scope and functionality described herein.

Turning now to a more detailed discussion of the global object service component 402. In one aspect, the global object service component 402 can be an API used to announce the presence of global objects 604. Because persistence of global objects 604 must be specifically provided for in different serialization techniques, it can be appropriate for the designer loader to be responsible for creating the global object service 402. Therefore, when the loader is initialized, there can be one such service 402 added to the designer by the designer loader. This service 402 can later be queried by other objects to discover and/or create global objects 604.

Internally, the global object service 402 can effect several functions. The global object service 402 can query (e.g., via query component 608) the various global object providers 404 in search for global objects 604. Each global object 604 returned can be queried for a compatible serializer. If none is found, that global object 604 is discarded, as it cannot be serialized. The global object service 402 can maintain a table of global objects in connection with the table of global object providers 602. This table 602 can track the origination provider 404 location of each of the global objects 604. When a global object 604 is added to the table 602, the global object service 402 can listen to events on the global object 604. When a global object instance is created, the global object service 402 can add metadata to the instance to allow it to be serialized. By way of example, the serializer for the global object instance can be taken from a call to GetSerializer on the global object 604 itself.

The global object service 402 listens to the change events for each global object. As described with reference to FIG. 5 supra, when a change event is raised, the global object service can scan all components on the design surface looking for properties that reference the instanced global object and updates these to point to a new instance. In response to the changing and/or changed events, this procedure can be effected in two passes.

The first pass can be directed toward a changing event. During the changing event, the instance property of the global object class still points to the original instance. All properties on all components can be walked and those that reference the global object 604 will be recorded. The property values of the global object instance that are read/write and serializable can be shallowly recorded.

The second pass can be directed to a changed event. The new instance can be obtained from the global object instance property. Once obtained, a global object service or designer may apply property and object settings that were recorded during the prior changing event, thereby reconfiguring the new global object to match the old.

For global-types, the same mechanism applies. However, refreshing objects for global types can be a bit more complex because there can be multiple instances for each global type. In this aspect, an additional table can be employed to do the update for each instance of each object. Finally, the global object service 402 component can listen to remove events from each global object or global type. When a remove is encountered, properties are again walked but this time the property value can be set to null.

An exemplary implementation of the global object service component 402 can be defined is as follows. It is to be appreciated that this exemplary aspect, and others that follow, is to provide context to the subject invention and is not intended to be limiting in any respect. Rather, the exemplary implementation(s) is provided for ease of understanding and for discussion and explanatory purposes only. As stated supra, although exemplary implementations are directed to specific-brand designer environments, it will be appreciated that the components and concepts disclosed herein can be employed in connection with any application and/or design environment known, or which becomes known, in the art. With this in mind, the exemplary global object service component 402 can be implemented as follows:

```
public sealed class GlobalObjectService : IDisposable {
    public GlobalObjectService(IServiceProvider provider,
    Project project,
    Type serializerType);
    public GlobalObjectCollection GetGlobalObjects( );
    public GlobalObjectCollection GetGlobalObjects(Type
baseType);
    public GlobalTypeCollection GetGlobalTypes( );
```

In the example provided supra, the GlobalObjectService class represents an exemplary public class. A constructor is provided and identified as GlobalObjectService. In accordance thereto, IserviceProvider provider argument refers to a service provider that can be used to obtain other services. The Project project argument refers to the project associated with the exemplary global object service 402. It will be appreciated that global objects 604 are "global" to a project. Finally, the Type serializer Type argument can be passed to the global object provider service 404 to enumerate providers that can offer the given serializer. This allows the global object service 402 to only offer global objects 604 that can be serialized using the current designer loader serialization mechanism.

Continuing with the exemplary implementation, the GetGlobalObjects method can reference the type baseType argument as illustrated. If specified, the returned set of global objects 604 can all be restricted to objects that derive from the given base type. If not specified, all global objects 604 will be returned. Essentially, the method can return a desired collection of global objects 604. This collection can be built each time the method is called, thus it can remain in sync with the set of global object providers 404. As noted, if a base type is specified, the collection will only consist of global objects 604 derived from the given base type. It will be appreciated that that these conditions can be left to the discretion of the global object provider 404.

It will be understood that GlobalObjectService will not validate that the global object providers 404 have returned a valid set of base types. In the example, GetGlobalObjects that takes no arguments and simply calls GetGlobalObjects(null). This method will not return a null collection object. Similarly, the GetGlobalTypes method can return a collection of global types. This collection can be built each time this method is called, thus it can remain in sync with the set of global object providers. This method will not return a null collection object.

Figure 7:
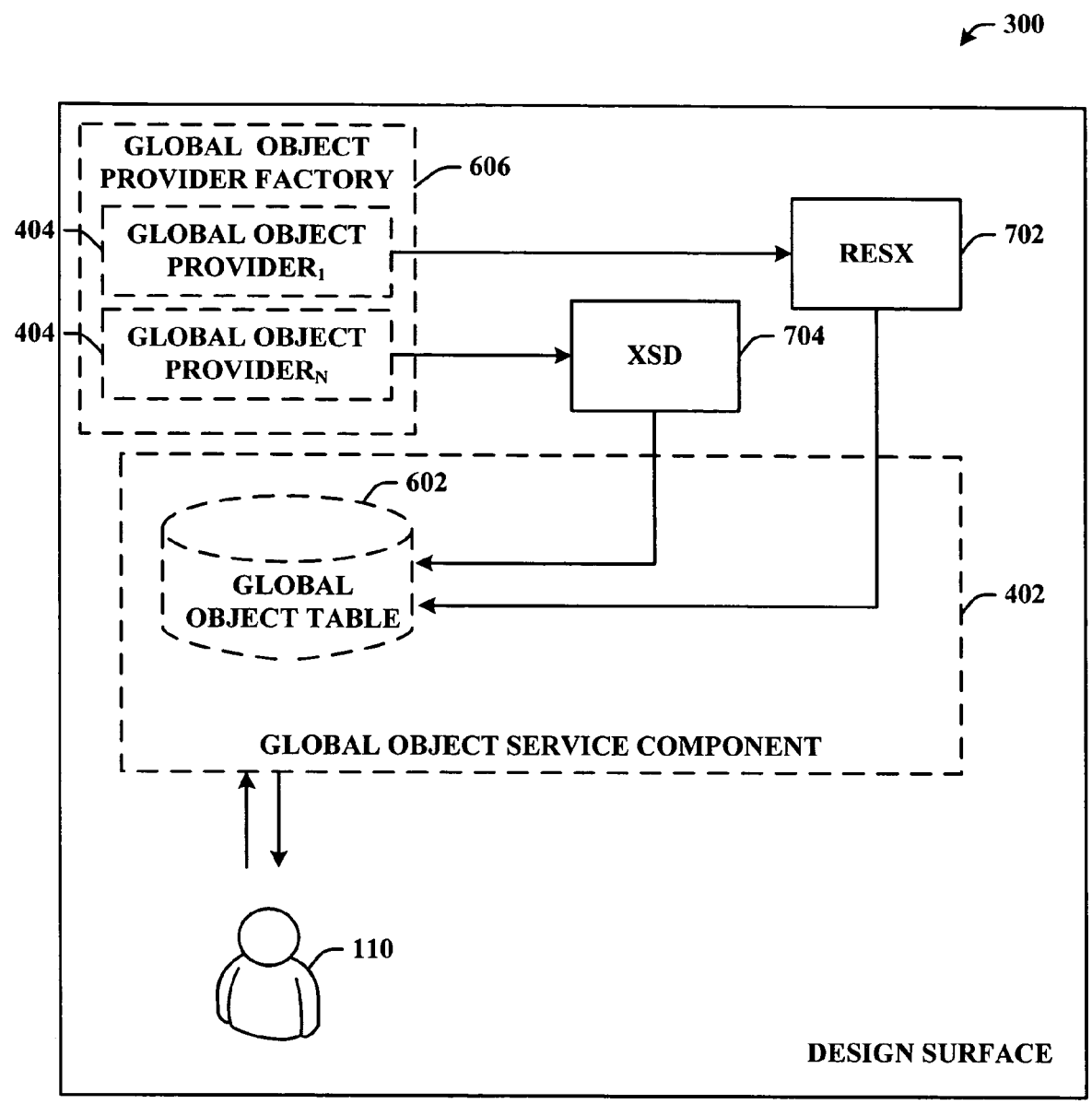
FIG. 7 illustrates an exemplary diagram having two distinct global object providers in accordance with an alternate aspect.

Turning now to a discussion of the global object provider 404. The global object provider 404 can provide zero or more global objects 702, 704 to the global object service 402. As illustrated in FIG. 7, there can be one global object provider 404 for all project-level resource files 702 (e.g., RESX), and another 704 for strongly typed datasets (e.g., XML). In a designer environment, global object providers 404 can be created via the VS ILocalRegistry construct and can be sited via IObjectWithSite upon creation. When a provider 404 is no longer needed by a global object service 402, the global object service 402 can dispose of the provider 404. When queried by the global object service 402, a global object provider 404 can return a collection of global objects. The global object provider 404 can return the same instance of a global object as long as it represents the same object.

An exemplary aspect of a global object provider component 404 can be implemented follows:

```
public abstract class GlobalObjectProvider : MarshalByRefObject,
    IDisposable,
    Studio.OLE.Interop.IObjectWithSite {
    public event EventHandler CollectionChanged;
    public void Dispose( );
    protected virtual void Dispose(bool disposing);
    protected object GetService(Type serviceType);
    public GlobalObjectCollection GetGlobalObjects(Project
project);
    public GlobalObjectCollection GetGlobalObjects(
        Project project,
        Type baseType);
    protected abstract GlobalObjectCollection
GetGlobalObjectsCore(
```

-continued

```
        Project project,
        Type baseType);
    public GlobalTypeCollection GetGlobalTypes(Project
project);
    protected virtual GlobalTypeCollection
GetGlobalTypesCore(Project project);
    protected virtual void OnCollectionChanged(EventArgs e);
```

In the example, a CollectionChanged event can be raised when the number of objects in either the global object or global tree collection changes. The Dispose method includes a System.Boolean disposing argument. If true, the object will be disposed. If false, it will be finalized. The GetService method can return an instance of the requested service or null if no such service exists. Additionally, the GetGlobalObjects method can return a collection of global objects. If a base type is specified, the collection should only include global objects derived from the given base type. GetGlobalObjects that takes only a project simply calls GetGlobalObjects(project, null). This should not return a null collection object.

Continuing with the example, the GetGlobalObjectsCore method can return a collection of global objects. If a base type is specified, the collection should only consist of global objects derived from the given base type. This method should not return a null collection object. This will be validated in the GetGlobalObjects methods that call this method.

The GetGlobalTypes method can return a collection of global types. This simply performs argument checking and calls GetGlobalTypesCore. Moreover, the GetGlobalTypesCore method can return a collection of global types for the project. The default implementation returns an empty collection. Finally, the OnCollectionChanged method can raise the CollectionChanged event.

Turning now to a discussion of a global object collection component. The global object collection can be delivered via a global object provider factory component 606. The global object collection can be a strongly typed collection of global objects. It will be appreciated that the collection can be read-write or read-only. A read-write collection can be cheaply passed to the constructor of the global object collection to make a read only version without copying the collection.

Following is an exemplary implementation of a global object collection:

```
[Serializable]
public sealed class GlobalObjectCollection : IList, ICollection,
    IEnumerable
    public GlobalObjectCollection( );
    public GlobalObjectCollection(GlobalObject[] items);
    public GlobalObjectCollection(GlobalObjectCollection
items);
    public GlobalObjectCollection(GlobalObject[]items, bool
readOnly);
    public GlobalObjectCollection(GlobalObjectCollection items,
bool readOnly);
    public int Count { get; }
    public bool IsFixedSize { get; }
    public bool IsReadOnly { get; }
    public bool IsSynchronized { get; }
    public object SyncRoot { get; }
    public GlobalObject this[int index] { get; set; }
    public int Add(GlobalObject item);
    public void AddRange(GlobalObject[] items);
    public void AddRange(GlobalObjectCollection items);
    public void Clear( );
public void CopyTo(GlobalObject[] array, int index);
    public bool Contains(GlobalObject item);
```

-continued

```
public IEnumerator GetEnumerator( );
    public int IndexOf(GlobalObject item);
    public void Insert(int index, GlobalObject item);
    public void Remove(GlobalObject item);
    public void RemoveAt(int index);
```

The example above represents a standard strongly typed collection of global objects. If readOnly is passed as true, the collection cannot be modified. The default value for readOnly if not passed is false.

Now with reference to a global type collection component, similar to the global object collection discussed supra, the global type collection is a strongly typed collection of global type objects. The collection can be read-write or read-only. A read-write collection can be cheaply passed to the constructor of global type collection to make a read only version without copying the collection.

Following is an exemplary aspect of a global type collection:

```
[Serializable]
public sealed class GlobalTypeCollection : CollectionBase {
    public GlobalTypeCollection ( );
    public GlobalTypeCollection (GlobalType[] items);
    public GlobalTypeCollection (GlobalTypeCollection items);
    public GlobalTypeCollection (GlobalType[]items, bool readOnly);
    public GlobalTypeCollection (GlobalTypeCollection items, bool readOnly);
        public int Count { get; }
        public bool IsFixedSize { get; }
        public bool IsReadOnly { get; }
        public bool IsSynchronized { get; }
        public object SyncRoot { get; }
        public GlobalType this[int index] { get; set; }
        public int Add(GlobalType item);
        public void AddRange(GlobalType[] items);
        public void AddRange(GlobalTypeCollection items);
        public void Clear( );
    public void CopyTo(GlobalType[] array, int index);
        public bool Contains(GlobalType item);
    public IEnumerator GetEnumerator( );
        public int IndexOf(GlobalType item);
        public void Insert(int index, GlobalType item);
        public void Remove(GlobalType item);
        public void RemoveAt(int index);
```

The example above represents a standard strongly-typed collection of types. If readOnly is passed as true, the collection cannot be modified. The default value for readOnly if not passed is false.

Referring now to a global type and/or virtual type component, the global type class can provide data about a specific global type. Global types can be created directly but sometimes need to be tracked for type changes, additions and removals. In an exemplary aspect, global types can inherit from MarshalByRefObject whereby a global object, which derives from global type, can have its instances marshal across domains.

An exemplary global type implementation is as follows:

```
public abstract class GlobalType : MarshalByRefObject {
    protected GlobalType(Type objectType);
    public Type ObjectType { get; }
    public event EventHandler Changed;
    public event EventHandler Changing;
```

-continued

```
    public event EventHandler Removed;
    public event EventHandler Removing;
        protected void ClearObjectType( );
    public override bool Equals(object o);
    public override int GetHashCode( );
    protected virtual Type GetObjectType( );
        protected virtual void OnChanged(EventArgs e);
        protected virtual void OnChanging(EventArgs e);
        protected virtual void OnRemoved(EventArgs e);
        protected virtual void OnRemoving(EventArgs e);
        protected virtual void PerformChange ( );
        protected virtual void PerformRemove ( );
```

In this example cross-domain example, the Global Type constructor (e.g., Type objectType) can effect generation of a new GlobalType instance. The ObjectType property specifies return of the type of this global type.

With respect to a changing event, the event is raised when the global type contained in this GlobalType class changes. A change causes the type of the global type to be changed. A change event begins by the Internal GlobalType code calling PerformChange. Next, PerformChange invokes OnChanging, calls ClearObjectType and finally invokes OnChanged.

Turning now to a removed event of the exemplary aspect, this event is raised when the global type contained in this GlobalType class is being removed and will no longer be available. For example, if an XSD file is removed from the project, the global type representing it is also removed. In operation, Internal GlobalType code calls PerformRemove. Next, PerformRemove invokes OnRemoving, calls ClearObjectType and invokes OnRemoved.

Similarly, a Removing Event is raised when the global type contained in this GlobalType class is being removed and will no longer be available. For example, if an XSD file is removed from the project, the global type representing it is also removed. The procedure for removing a global type starts by the Internal GlobalType code calling PerformRemove. Next, PerformRemove invokes OnRemoving, clears instance value, if present, and finally invokes OnRemoved.

A ClearObjectType method clears the ObjectType property. This method is invoked during PerformChange and PerformRemove, but can be invoked manually in cases where events are to be raised manually. An Equals method is an override of Object.Equals. This can compare equality of two global types by comparing their ObjectType properties. The GetHashCode method is an override of Object.GetHashCode. This generates a hash code based on the ObjectType property value hash codes.

The GetObjectType method can be called by the ObjectType property to retrieve the type of this global type. Once retrieved the value can be cached until PerformChange is called. The default implementation of this method returns the type that was passed into the GlobalType constructor. The OnChanged method can invoke the changed event handler. Similarly, the OnChanging method can invoke the Changing event handler. Next, the OnRemoved method can invoke the Removed event handler and likewise, the OnRemoving method can invoke the Removing event handler.

The PerformChange method is intended to be called by deriving classes when the shape of a global type changes. In operation this method calls OnChanging, calls ClearType and finally, calls OnChanged. Similarly, a PerformRemove method is intended to be called by deriving classes when a global type is no longer available. This method raises events that allow parties using the global object to detach. In doing so, this method calls OnRemoving, calls ClearType and finally, calls OnRemoved.

With reference now to a discussion of the global object component 604. The global object class can provide data about a specific global object component 604. Although a user can perceive global objects 604 as global, which is consistent with how they behave at runtime, it will be appreciated that, at design time, they are actually instanced per-designer. This functionality allows the designers to maintain their own copies and remain isolated. The global object service 402 interacts with instances of global objects 604 in order to create these per-designer global object instances.

In the exemplary environment, a global object component 604 can inherit from MarshalByRefObject in anticipation of its need to marshal across application domains. Although this aspect is directed toward a multiple application domain aspect, the features and functionality can be applied to a single application domain example without departing from the scope of the claims appended hereto. The actual instantiation of a global object 604 would happen in the default domain. Further, the global object instance must be serializable thus enabling it to be marshaled across the domain boundary.

An exemplary implementation of a global object 604 is as follows:

```
public abstract class GlobalObject : GlobalType {
    protected GlobalObject(Type objectType, string objectName);
    public object Instance { get; }
    public string Name { get; }
    public event EventHandler Created;
    protected void ClearInstance( );
    protected virtual object CreateInstance ( );
    public override bool Equals(object o);
    public override int GetHashCode( );
    public object GetSerializer (Type serializerType);
    public abstract object GetSerializerCore (Type serializerType);
    protected virtual void OnCreated(EventArgs e);
    protected override void PerformChange ( );
    protected override void PerformRemove ( );
```

In accordance with the exemplary aspect supra, the GlobalObject constructor can create a new GlobalObject instance. With respect to the Instance Property, demand creates the instance of this global object 604. It will be understood that that some global objects 604 can only provide static members—in which case Instance will return null. The Name property returns the recommend name of the global object 604. The actual name for this global object 604 can differ if there are conflicts or language limitations that prevent this name from being used. This name is only used at design time to identify the global object 604 to the user 110. Names can be unique for all global objects 604 within a given provider 404.

A Created event is raised when the Instance property is first accessed and a new instance of the global object 604 is created. If the global object 604 represents an object with all static members this event will never be raised. Raising this event occurs in the Instance property itself as outlined in the following exemplary pseudo-code:

```
if (instance == null) {
    instance = CreateInstance( );
    if (instance != null) OnCreated(EventArgs.Empty);
```

The ClearInstance method clears the instance property. This is usually invoked during PerformChange and PerformRemove, but can be invoked manually in cases where events are raised manually. On the other hand, the CreateInstance method can be called by the Instance property once to create a cached instance of the global object 604. This method can create an instance of the global object type and return the same. The instance returned is preferably serializable—whereby the caller validates the same. A default implementation of this method can call TypeDescriptor.CreateInstance to create an instance of the global object 604. It will be understood that override of this method is possible to populate the object with data.

The Equals method can override GlobalType.Equals. This method compares equality of two global objects by comparing the Name and ObjectType properties. Correspondingly, the GetHashCode method can override of GlobalType.GetHashCode. This method generates a hash code based on the Name and ObjectType property value hash codes.

The GetSerializer method can retrieve the serializer for the global object 604. This non-virtual method argument checks and delegates to GetSerializerCore. Additionally, it argument checks the return value from GetSerializerCore to ensure it is either null or a serializer of type serializerType. Serializers returned from GetSerializer must be serializable so they can marshal across domain boundaries as necessary. This serialization requirement can be enforced in GetSerializer. The GetSerializerCore method can retrieve the serializer for this global object. This method is called from CreateSerializer after it performs argument validation. The method should return a serializer of the specified type, or null if it does not support the serialization type.

The OnCreated method invokes the Created event handler. Further, the PerformChange method is intended to be called by deriving classes when the shape or data within a global object 604 changes. In operation, this method calls OnChanging, nulls the object instance and calls OnChanged. Likewise, the PerformRemove method is intended to be called by deriving classes when a global object 604 is no longer available. This method raises events that allow parties using the global object to detach. In operation, this method calls OnRemoving, nulls the object instance and Call OnRemoved.

The provide global object provider attribute component can be placed on a package to declare one or more global object providers 404. The RegPkg tool will use this attribute to add registration information about the global object provider 404. It is to be appreciated that this attribute should only be used for registration and does not affect runtime behavior. Additionally, this attribute should be placed on a package class.

An exemplary implementation of the attribute is as follows:

```
public sealed class ProvideGlobalObjectProviderAttribute :
RegistrationAttribute {
    public ProvideGlobalObjectProviderAttribute(Type providerType);
    public Type ProviderType { get; }
```

With respect to the ProvideGlobalObjectProviderAttribute class, ProvideGlobalObjectProviderAttribute constructor creates a new attribute. The ProviderType property returns the provider 404 a type passed into the constructor. Accordingly, the following exemplary registry entries are created during registration of this attribute:

```
VSROOT\GlobalObjectProviders\{ObjectGuid}=<provider name>
VSROOT\CLSID\{ObjectGuid}
VSROOT\CLSID\{ObjectGuid}\@=ObjectType.FullName
VSROOT\CLSID\{ObjectGuid}\InprocServer32=mscoree.dll
VSROOT\CLSID\{ObjectGuid}\Class=ObjectType.FullName
VSROOT\CLSID\{ObjectGuid}\Assembly=ObjectType.Assembly.Full
Name
    VSROOT\CLSID\{ObjectGuid}\ThreadingModel=Both
```

Turning now to a discussion of the global object provider factory component 606. The global object provider factory 606 implements an enumeration mechanism for global object providers 404. It will be appreciated that, in accordance with the exemplary environment aspect discussed herein, there is a default implementation of this service built into the environment. Those skilled in the art will understand that customization can be effected by identifying which global objects 604 should be returned by providing their own GlobalObjectProviderFactory in the project context. This procedure can preempt any service that is built into the design package.

In the exemplary implementation that follows, the GlobalObjectProviderFactory can look into the registry for all available global object providers 404. It is not necessary for the GlobalObjectProviderFactory to cache any data.

```
public abstract class GlobalObjectProviderFactory :
MarshalByRefObject {
    public abstract GlobalObjectProvider[] GetProviders( );
```

With respect to the GlobalObjectProviderFactory class the GetProviders method can facilitate return of an array of global object providers 404. This method should not return null. Upon implementation, global object providers 404 can return a union of any custom class a user desires to define and the return value from any static property or method on the defined class.

To provide context, following are a couple of exemplary aspects of implementations. The first example is directed to a Custom DataSet as follows:

```
public sealed class Customers : DataSet {
    private Customers _instance;
    private Customers( ) {}
    public static Customers Instance {
        if (_instance == null) _instance = new Customers( );
        return _instance;
```

In order to determine how many global objects to define, a formula that represents the union of 1) any custom class a user desires to define and 2) the return value from any static property or method on that class can be applied. Accordingly, using the formula above it will be understood that there can be a custom class called "Customers" and a single static property called "Instance." Because the return value of Instance is just an instance of Customers, there is only a need to define one global object.

The second example is directed toward a strongly typed resource. For example:

```
public sealed class AppResources {
    private AppResources( ) {}
    public static Bitmap Logo { get; }
    public static Icon ApplicationIcon { get; }
    public static string ErrorMessage { get; }
```

Again, applying the formula above, there can be a custom class called "AppResources" and three static properties that all return unique values. Therefore, a total of four global object 604 that the global object provider 404 must return. Accordingly, because AppResources is not itself created, the global object 604 for the AppResourcesClass will always return null from its Instance property.

Figure 8:
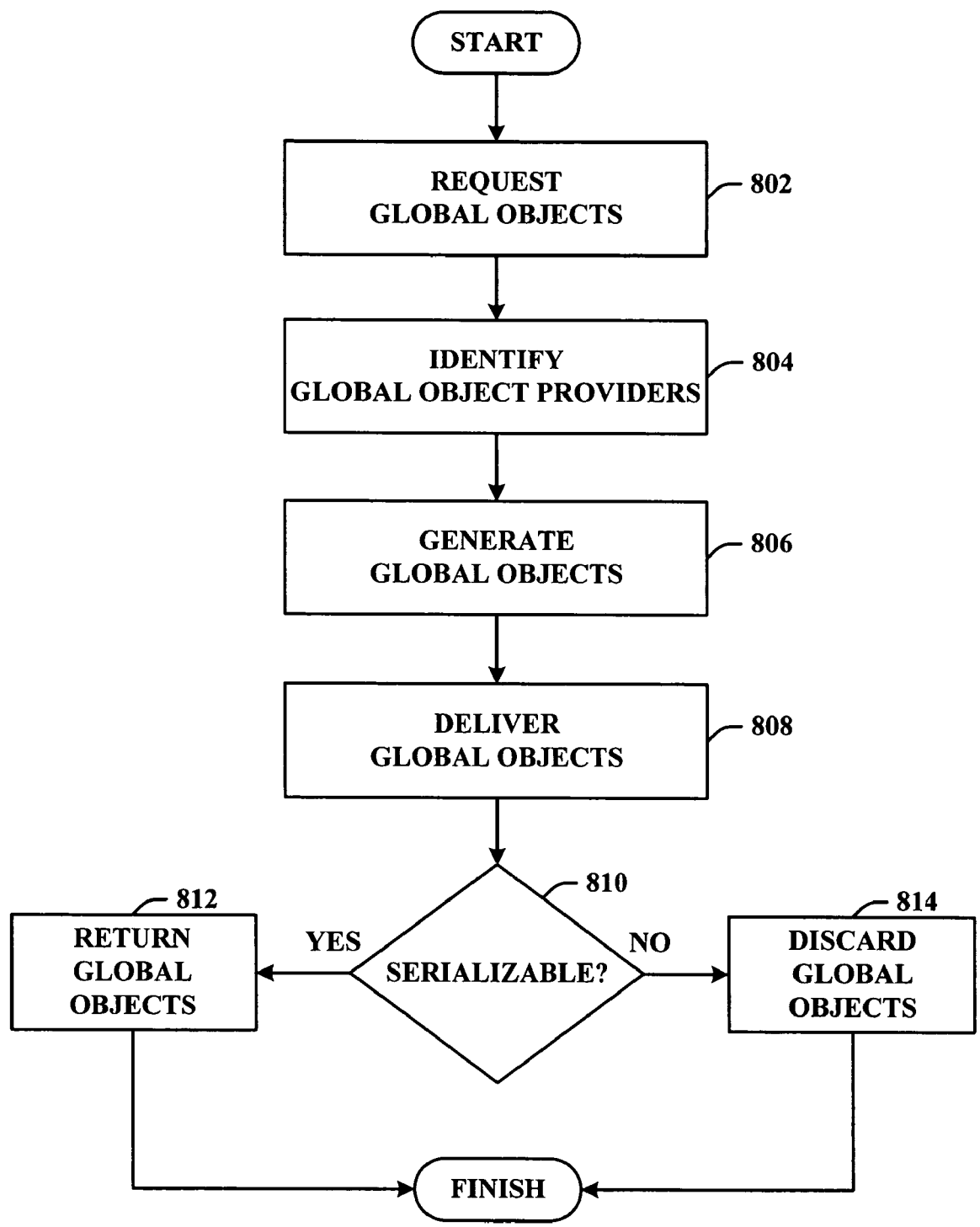
FIG. 8 illustrates an exemplary flow chart of procedures to request and deliver a global object in accordance with a disclosed aspect.

FIG. 8 illustrates a general flow chart of a methodology that facilitates the use of a global object in accordance with an aspect of the subject invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the subject invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

At 802, a global object is requested. As discussed supra, this request can be generated by a designer either manually or automatically. As described in detail above, the global object service can process the request for a global object. Next, at 804, a query can be employed to identify global object providers capable of providing global objects in accordance with the request. As previously described, this query can be effected via a query component integral to the global object service upon a global object provider factory. The request can specify global objects which derive from a particular type. As well, if a type is not specified, all available global objects will be identified to match the request.

Once identified, at 806, global objects can be generated by the provider(s). It will be appreciated from the discussion herein that a global object factory can be employed facilitate in effecting the identification of the appropriate global object providers and therefore, the generation of the appropriate global objects. At 808, global objects which comply with the initial request can be delivered to a designer. As discussed, at 810, the system can next determine if the returned global object is serializable.

If at 810 a determination is made that the global object is serializable, the global object is retained at 812. If, on the other hand, a determination is made that the global object is not serializable, the global object is discarded at 814 as illustrated.

Figure 9:
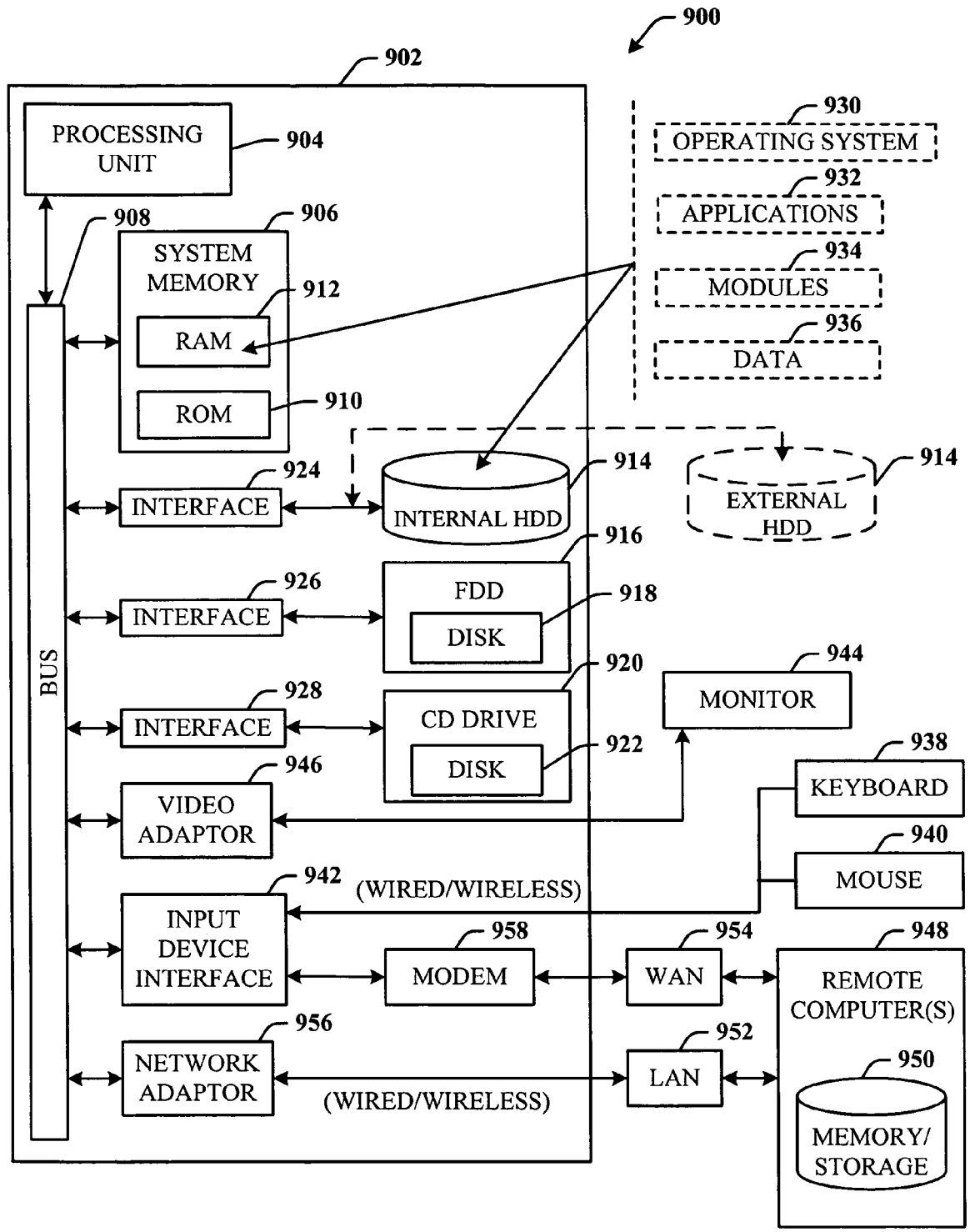
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects of the subject invention, FIG. 9 and the following discussion are intended to provide a brief, general description of a suitable computing environment 900 in which the various aspects of the subject invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, there is illustrated an exemplary environment 900 for implementing various aspects of the invention that includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the subject invention.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the subject invention can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices, and companies, and facilitate enterprise-wide computer networks, such as intranets, all of which may connect to a global communication network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956. When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
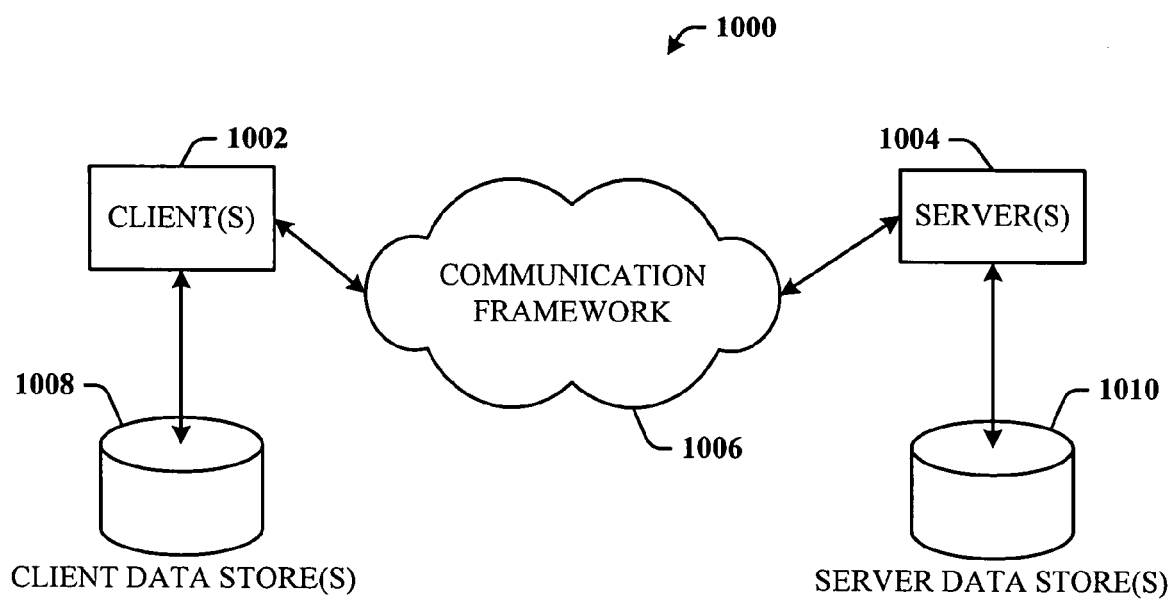
FIG. 10 illustrates a schematic block diagram of an exemplary computing environment in accordance with the subject invention.

Referring now to FIG. 10, there is illustrated a schematic block diagram of an exemplary computing environment 1000 in accordance with the subject invention. The system 1000 includes one or more client(s) 1002. The client(s) 1002 can be hardware and/or software (e.g., threads, processes, computing devices). The client(s) 1002 can house cookie(s) and/or associated contextual information by employing the subject invention, for example. The system 1000 also includes one or more server(s) 1004. The server(s) 1004 can also be hardware and/or software (e.g., threads, processes, computing devices). The servers 1004 can house threads to perform transformations by employing the subject invention, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for generating virtual types that represent objects of uncompiled source code such that the virtual types are accessible within a design tool as if they were compiled without having to load any assembly from the source code, the system comprising a processor and a memory in communication with the processor, the processor executing the following computer executable components that are stored in the memory:
   a builder component that receives a specification related to an object type and builds a clone of the object type in accordance with the specification, the object type being of an arbitrary base class;
   an implementer component that enables configuration of the clone as a virtual object type that is not compiled, the virtual object type being configured with data representing a first object type in a project in a design tool that is not compiled, wherein the virtual object type appears as a compiled first object type when accessed in the design tool via a reflection application program interface (API).

2. The system of claim 1, wherein the virtual object type inherits from the compiled object type.

3. The system of claim 1, wherein the specification component defines a base type.

4. The system of claim 1, further comprising the reflection API, wherein the reflection API renders the virtual object type in a manner consistent with the compiled object type.

5. The system of claim 1, wherein the specification is generated from a CodeDOM tree.

6. The system of claim 1, wherein the specification is generated programmatically.

7. A method for creating a virtual object type that emulates a compiled type, wherein the method is performed by a processor that executes the following acts:
   receiving a specification of a compiled object type;
   building a clone of the compiled object type in accordance with the specification, the compiled object type being of an arbitrary base class; and
   generating the virtual object type by configuring the clone with data representing a first object in a project in a design toll that is not compiled, and wherein the virtual object type simulates the first object as if it were compiled and loaded when accessed via a reflection application program interface (API).

8. The method of claim 7, wherein generating the virtual object type includes inheriting from the compiled object type.

9. The method of claim 8, further comprising defining a base type of the specification.

10. The method of claim 7, further comprising reflecting the virtual object type as the compiled object type.

11. The method of claim 7, further comprising employing the virtual object type as a built type.

12. The method of claim 7, further comprising generating the specification from a CodeDom tree.

13. The method of claim 7, further comprising generating the specification programmatically.

14. One or more computer storage media having stored thereon computer executable instructions which when executed by a processor perform steps for creating a virtual object type that emulates a compiled type, comprising:

receiving a specification of a compiled object type;

building a clone of the compiled object type in accordance with the specification, the compiled object type being of an arbitrary base class; and generating the virtual object type by configuring the clone with data representing a first object in a project in a design toll that is not compiled, and wherein the virtual object type simulates the first object as if it were compiled and loaded when accessed via a reflection application program interface (API).

15. The computer storage media of claim 14, wherein generating the virtual object type includes inheriting from the compiled object type.

16. The computer storage media of claim 15, further comprising defining a base type of the specification.

17. The computer storage media of claim 14, further comprising reflecting the virtual object type as the compiled object type.

18. The computer storage media of claim 14, further comprising employing the virtual object type as a built type.

19. The computer storage media of claim 14, further comprising generating the specification from a CodeDom tree.

20. The computer storage media of claim 14, further comprising generating the specification programmatically.

* * * * *